Dec. 1, 1936.    S. C. CLARK ET AL    2,062,864
HEATING SYSTEM FOR VEHICLE BODIES
Filed Sept. 30, 1935    2 Sheets-Sheet 1
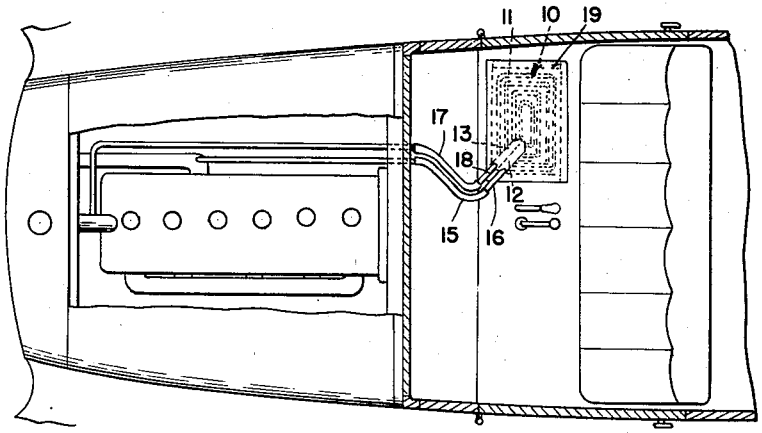
FIG.1.
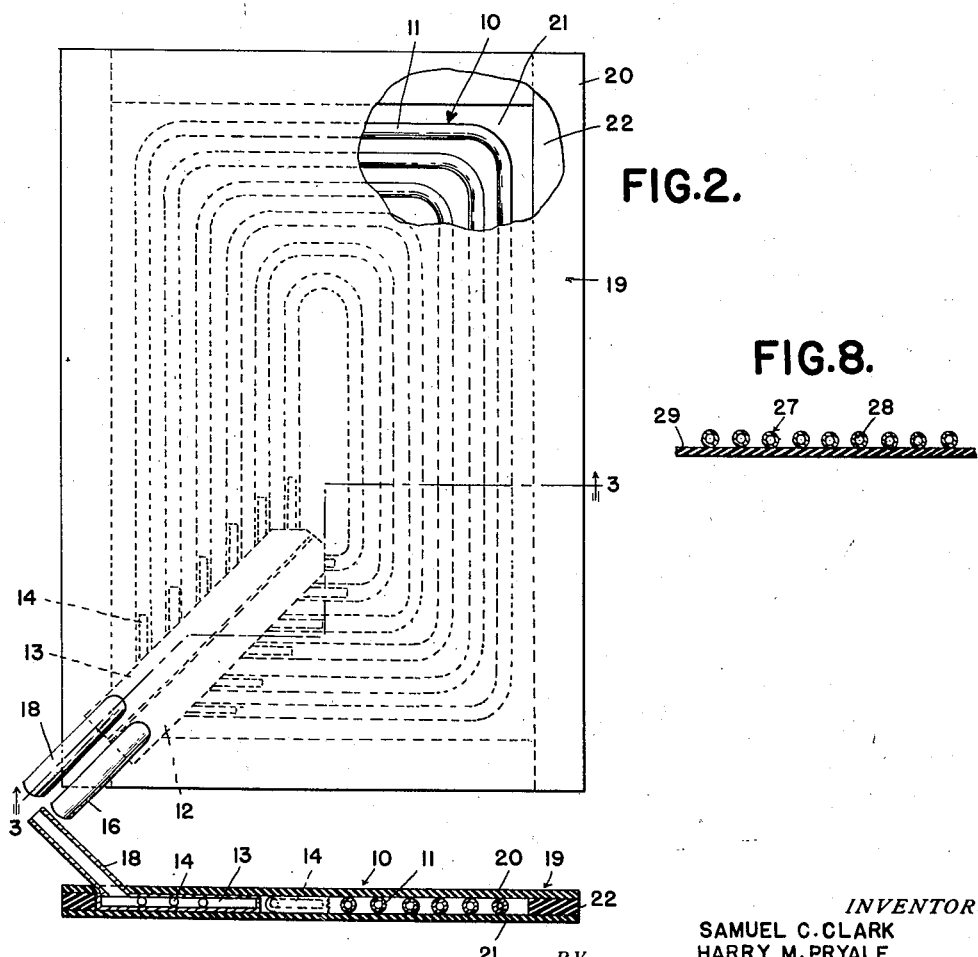
FIG.2.
FIG.8.
FIG.3.
INVENTORS
SAMUEL C. CLARK
HARRY M. PRYALE
BY
ATTORNEYS Dec. 1, 1936.  S. C. CLARK ET AL  2,062,864
HEATING SYSTEM FOR VEHICLE BODIES
Filed Sept. 30, 1935  2 Sheets-Sheet 2
FIG.4.
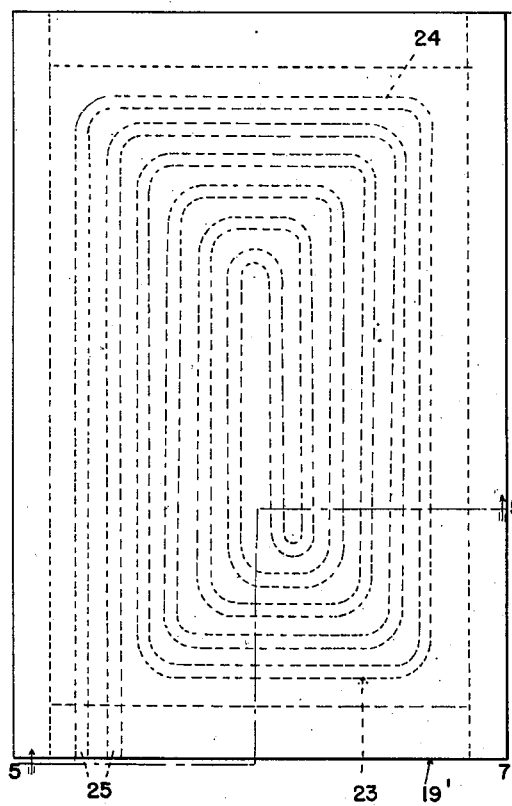
FIG.6.
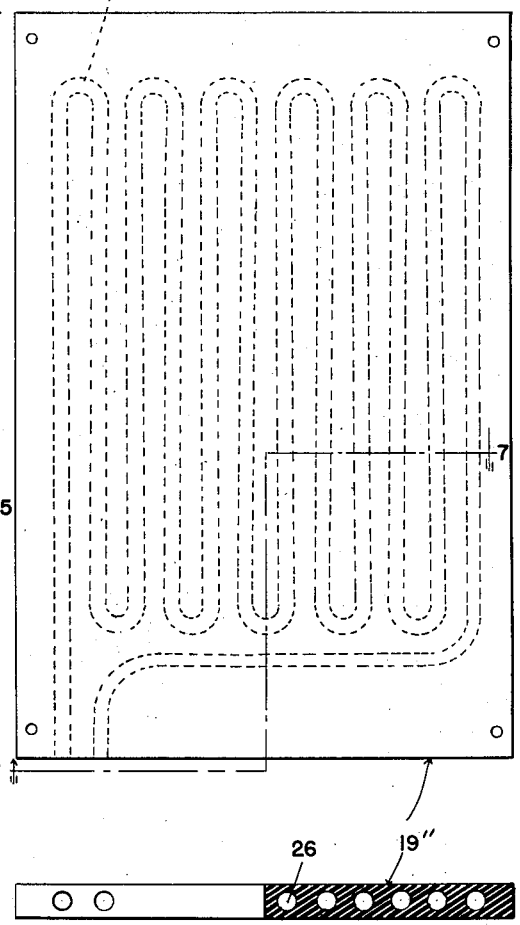
FIG.5.
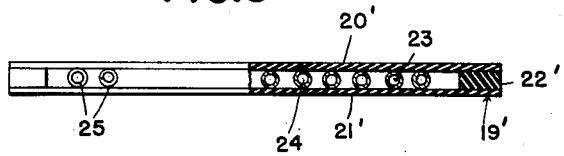
FIG.7.
INVENTORS
SAMUEL C. CLARK
HARRY M. PRYALE
BY
ATTORNEYS Patented Dec. 1, 1936

2,062,864

UNITED STATES PATENT OFFICE 2,062,864

HEATING SYSTEM FOR VEHICLE BODIES

Samuel C. Clark and Harry M. Pryale,
Pontiac, Mich.

Application September 30, 1935, Serial No. 42,961

3 Claims. (Cl. 257—158)

This invention relates generally to heating systems for vehicle bodies and refers more particularly to improvements in the construction of the heat exchange unit.

One of the principal objects of the present invention consists in the provision of a heating system of the character previously set forth, having a heat exchange unit comprising a covering for the flooring of the vehicle body in the form of a mat having communicating passages concealed therein for the heating fluid. In accordance with this invention, the passage may either be in the form of cavities fashioned in the mat during the manufacture of the latter, or may be in the form of separate tubes.

Another object of this invention resides in the provision of a floor mat having vertically spaced flexible walls and having a heat exchange unit provided with flexible tubes located between the walls to not only receive the heating medium, but to also form a cushion for the top wall of the mat.

The foregoing, as well as other objects, will be made more apparent as this description proceeds, especially when considered in connection with the accompanying drawings wherein, Figure 1 is a semi-diagrammatic view of a portion of a motor vehicle having a heating system embodying a heat exchange unit constructed in accordance with this invention.

Figure 2 is an enlarged plan view of the heat exchange unit shown in Figure 1.

Figure 3 is a sectional view taken on the plane indicated by the line 3—3 of Figure 2.

Figure 4 is a plan view of a heat exchange unit featuring a modified form of the present invention.

Figure 5 is a sectional view taken substantially on the plane indicated by the line 5—5 of Figure 4.

Figure 6 is a plan view of a heat exchange unit illustrating another modified form of construction.

Figure 7 is a sectional view taken substantially on the plane indicated by the line 7—7 of Figure 6, and Figure 8 is a fragmentary sectional view showing still another embodiment of this invention.

Referring now more in detail to the drawings and with special reference to the embodiment of the invention illustrated in Figures 1 to 3, inclusive, it will be noted that the reference character 10 designates a heating element comprising a plurality of coils 11 of a size predetermined to permit nesting the coils in a common plane. In this embodiment of the invention, the coils 11 are preferably formed of a material containing rubber so as to possess a limited degree of flexibility and the opposite ends of each coil respectively, communicate with the intake and exhaust manifolds 12 and 13. The manifolds are preferably formed of sheet metal and as shown in Figure 2, are positioned adjacent each other in the plane of the tubing. It will also be observed from Figure 2 that each manifold is provided with a plurality of radially extending nipples 14 corresponding in number to the number of coils 11 and serving to connect the extremity of the tubes to the manifolds. In the present instance, the intake manifold 12 communicates with the water circulating system of the internal combustion engine through the medium of a flexible conduit 15, having the discharge end clamped to the free end of a tube 16 leading from the intake manifold 12. The exhaust manifold 13 is connected to the return side of the water circulating system of the internal combustion engine through the medium of a flexible conduit 17, similar to the conduit 15, and having the receiving end clamped to a tube 18 leading from the exhaust manifold 13.

As previously stated, the heat exchange unit 10 is embodied in the covering for the flooring of the vehicle body so as to form a unit therewith. In the present instance, the covering comprises a mat 19 preferably formed of molded rubber and having top and bottom sheets 20 and 21, respectively, secured together in spaced relationship by means of the spacers 22, disposed between the marginal portions of the sheets. As shown more particularly in Figure 3, the top and bottom sheets of the mat co-operate with the spacers 22 to provide an inclosed space of sufficient dimension to accommodate the heat exchange unit 10. It will also be apparent from the above figure that the diameter of the tubes 11 approximates the distance between the top and bottom sheets of the mat and, as a consequence, the tubes perform the additional function of cushioning the top wall or tread portion of the mat. In actual practice, the heat exchange unit is assembled upon the bottom sheet 21 of the mat prior to securing the marginal portions of the top sheet to the bottom sheet by the spacers 22. In this connection, it may be pointed out that the spacers 22 may either be vulcanized, cemented or otherwise secured to the top and bottom sheets. After the heat exchange unit has been assembled upon the bottom sheet 21 of the mat and the top sheet 20 has been permanently secured in place, a unitary construction results capable of being readily installed in, or removed from the vehicle body. Upon properly positioning the mat on the flooring of the vehicle body, the heater may be expediently placed in operation by merely clamping conduits 15 and 17, extending from the water circulating system of the internal combustion engine to the tubes 16 and 18.

The embodiment of the invention illustrated in Figures 4 and 5 is similar in principle to the one described above but differs structurally from the latter in that the passages embodied in the mat 19' are formed by a single strip of metallic tubing designated generally by the reference character 23. As shown in Figure 4, the tubing 23 is fashioned to provide a series of coils 24, arranged in a common plane with the free ends 25 of the tubing extending to one side edge of the mat 19' so as to permit the heating fluid to be circulated through the tubing. The construction of the mat 19' is substantially identical to the mat 19 in that the top and bottom walls 20' and 21', respectively, of the mat 19' co-operate with the spacers 22' in forming a space of sufficient dimension to house the tube 23.

The modification illustrated in Figures 6 and 7 differs from either of the foregoing constructions in that the tubing is entirely eliminated and the heating fluid is circulated through a circuitous passage 26 formed in the mat during the molding operation. As shown particularly in Figure 7, the mat 19" is formed of one piece of material containing rubber and the circuitous passage 26 is molded within the mat. Upon reference to Figure 6, it will be noted that the opposite ends of the passages 26 extend to one edge of the mat for the purpose of connecting the passages in the water circulating system of the internal combustion engine.

In Figure 8, we have illustrated the manner in which the principles of the present invention may be realized by merely supporting coiled tubing of the type shown in Figure 4 upon the top surface of a floor mat. In detail, the reference numeral 27 designates a heat exchange unit comprising a length of metallic tubing 28 coiled in the manner shown in Figure 4 and supported on a floor mat 29, preferably formed of a material containing rubber.

While in describing the present invention several embodiments have been selected for the purpose of illustration, nevertheless, it will be noted that these embodiments possess certain common features. In this connection, it is to be noted that each modification of the present invention contemplates associating the heat exchange unit of the heating system with the floor covering of the body in such a manner as to appreciably simplify and expedite the installation of the heating unit. In the embodiments of the invention featured in Figures 1 to 7, inclusive, the heat exchange unit is actually concealed within the floor covering, and is capable of being assembled with and removed from the body as a unit with the floor covering. In addition, each of the embodiments of the invention offer the possibility of providing a heat exchange unit having a relatively large radiating surface without interfering with the leg room afforded in the body. It will further be observed that by associating the heat exchange unit with the floor covering, the air heated by the unit will rise upwardly into the body without the assistance of the usual expensive force draft mechanism.

What we claim as our invention is:

1. In a heating system for vehicle bodies, a heat exchange unit comprising a flexible mat for the flooring of the body having a recess therein, an intake manifold housed within the recess and having a series of nipples projecting laterally therefrom into the recess, an exhaust manifold positioned within the recess adjacent the intake manifold and also having a series of nipples extending laterally therefrom, and flexible tubing housed within the recess having the intake ends secured to the nipples on the intake manifold and having the opposite ends secured to the nipples on the exhaust manifold.

2. In a heating system, a combined heating unit and floor mat comprising, vertically spaced flexible walls secured together at the marginal edges thereof to provide an enclosed space, a heat exchange unit having flexible tubes located in said space between the walls aforesaid in lateral spaced relationship and having an outside diameter approximating the distance between the walls to form a cushion for the top wall of the mat, and means for introducing a heating medium into the tubes.

3. In a heating system, a combined heating unit and floor mat comprising, vertically spaced sheets of rubber material, a spacer of rubber material located between the marginal edge portions of the sheets and vulcanized to the latter, a heat exchange unit having laterally spaced flexible conduits located within the space defined by said sheets and spacer, said conduits having an outside diameter approximating the distance between said sheets to form a cushion for the top sheet, and means for introducing a heating medium into the conduits.

SAMUEL C. CLARK.
HARRY M. PRYALE.